United States Patent Office 3,089,129
Patented May 7, 1963

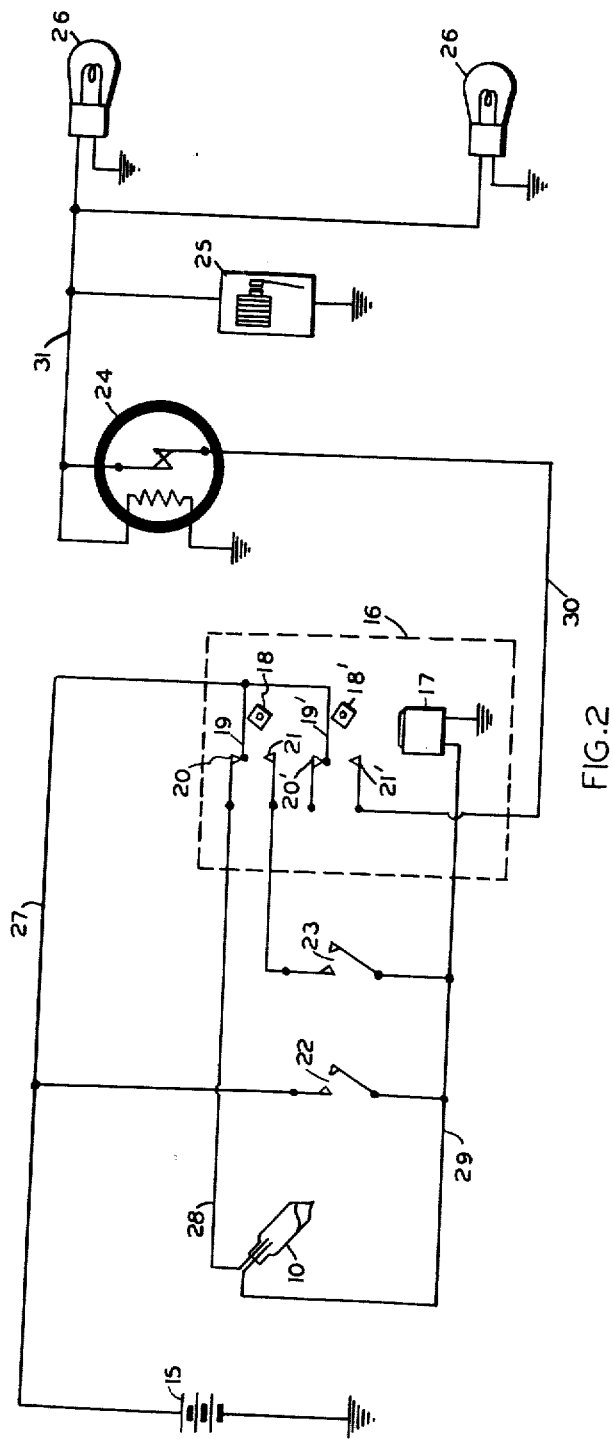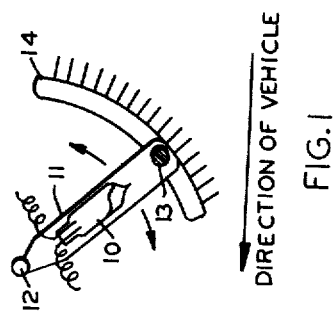

3,089,129
AUTOMATIC VEHICLE WARNING SYSTEM
Euripides R. Nassikas, 7033 Meade St., and Angelo M. Caloyer, 115 Hawthorne Drive, both of Pittsburgh, Pa.
Filed Oct. 25, 1960, Ser. No. 64,752
7 Claims. (Cl. 340—262)

This invention relates to an electrical warning system which is automatically energized upon a change in velocity of a body, and more particularly, to a safety blinker light system for a vehicle which is automatically energized upon a pre-selected deceleration of the vehicle.

In view of the increased horsepower, potential speed, and braking power of present-day automobiles, the brake-light system presently utilized to indicate the deceleration or stopping of a vehicle is insufficient to quickly and adequately warn following motorists of the danger so as to prevent rear end collisions. This is substantiated by the fact that statistics have shown that on superhighways rear end collisions are responsible for about half of the fatalities occurring on such highways.

Due to the mode of operation of the presently used brake-light warning system, it has inherent disadvantages which render it unsuitable for present-day safety requirements. For instance, it only operates when the brake pedal is retained in a depressed position, and then merely produces a steady red glow from the tail light of the vehicle. Such a steady glow, particularly at night, may easily be confused with or mistakenly believed to be the glow from the standard tail light. Accordingly, although the brake-light may be working, the signal produced would be inadequate to actually forewarn a following motorist that the vehicle in front of him is rapidly decelerating. Further, after the vehicle has been brought to a stop and the brake pedal released, the tail light is no longer energized, even though the vehicle may be in a hazardous position on the highway. Therefore, an oncoming motorist would be given no visual warning signal that the stopped vehicle is, in fact, not moving at a normal speed, and he may come into precariously close proximity with the stopped vehicle before recognizing this fact.

In order to overcome the disadvantages of the present-day system, several devices have been suggested for vehicles, which energize warning lights in response to the position of the accelerator pedal. However, even these proposed systems are not completely satisfactory. In such devices, a mechanical or mercury switch is attached to or controlled by the throttle rod of an accelerator pedal in such a manner so that when pressure on the accelerator pedal is released and it is returned to its normal idling position, the switches are activated or closed to energize warning lights at the rear of the vehicle. However, due to the mode of operation of these devices, they do not necessarily give a true warning of deceleration, since when a vehicle is on a downhill slope, a release of the accelerator will energize the system to indicate a deceleration, even though the vehicle may be actually accelerating due to gravity.

We have devised a completely new warning system for indicating a change in velocity of a body which alleviates the problems heretofore encountered with known alarm systems. Our system functions on a new principle of operation, wherein the system is automatically energized upon a pre-determined change in velocity of the body, without relying on manually operable mechanical linkage between the body and the warning system. After being activated, the system remains energized, providing continuing warning signals until it is either manually de-energized, or automatically de-energized upon the body resuming a pre-selected operating condition, such as the attainment of a pre-selected speed.

It thus has been an object of our invention to provide an improved warning system which obviates the above enumerated problems heretofore encountered with known warning systems;

A further object of our invention has been to provide an improved warning system which is automatically energized upon a pre-selected change in velocity of the body to which the system is applied;

An additonal object of our invention has been to provide an improved warning system which is automatically energized upon a pre-determined amount of deceleration, wherein the amount of deceleration necessary to energize the system may be varied and pre-set to selected rates;

A still further object of our invention has been to provide an improved warning system which may be either manually energized or automatically energized upon the attainment of a pre-determined deceleration, and which remains energized until either manually de-energized or automatically de-energized upon the attainment of a pre-selected operating condition;

A still further object of our invention has been to utilize the principle of inertia to activate our improved warning system wherein mercury within a mercury switch, mounted on a moving body in a forwardly inclined manner in the direction of movement, will continue to move forwardly within the switch to close its contacts when the body is decelerated;

These and other objects of our invention will be apparto those skilled in the art from the following disclosure and accompanying drawings in which:

FIGURE 1 is a side elevational view illustrating a manner in which the mercury switch may be adjustably mounted on a body in a forwardly inclined position; and, FIGURE 2 is a schematic wiring diagram of our improved automatic warning system.

Referring now to the drawings and particularly FIGURE 1, a mercury switch 10 is shown mounted on an arm 11 which is pivotally mounted at 12 to a suitable support on a movable body such as a vehicle. It will be noted that the axis of the pivotable connection 12 is transverse or perpendicular to the normal direction of movement of the vehicle, so that the mercury switch 10 is inclined forwardly in the direction of normal vehicle movement. The amount of inclination of the mercury switch 10 may be adjusted by pivoting the arm 11 about the pivotable connection 12 and locking it in place at any desired inclination. An indicator 13 may travel along a slotted arcuate scale 14 to provide an indication of the position of switch 10, when the switch is enclosed within a housing.

Referring now to the schematic wiring diagram shown in FIGURE 2, the switch 10, shown in its normally open position, is connected to a battery 15 through a normally closed contact of a suitable relay 16. The switch 10 is connected in series with an activating coil 17 of the relay 16, which when energized by the mercury switch, closes a contact to complete a circuit from the battery 15 through a delay relay 24 to a plurality of indicating lamps 26 connected in series with the delay relay. Although various relay switches may be used, a double pole double throw ratchet relay switch, such as type AP11D manufactured by Potter & Brumfield, is represented at 16.

The relay has an electrically energizable impulse magnetic coil 17 which activates a ratchet arm (not shown) when the coil is energized, to simultaneously rotate cams 18, 18'. A pair of resilient switch arms 19, 19', connected to an inlet lead 27, are normally closed on contacts 20, 20' when the system is not energized. Contact 20 is connected to one side of switch 10 by a lead 28, whereas contact 20' is merely a dummy contact and may be eliminated. When switch 10, connected by a lead 29 to coil 17, is closed, the coil is energized to activate the ratchet arm and rotate cams 18, 18' which permits the switch arms 19, 19' to engage contacts 21, 21', respectively. Contact 21 is connected to a normally open speedometer switch 23, whereas contact 21' is connected by a lead 30 to delay relay 24.

A normally open manually operated switch 22, which may be conveniently located on a dashboard of a vehicle, is connected in parallel with switch 10 between leads 27 and 29. Since the coil 17 is of an impulse type for opening and closing circuits upon each impulse, the switch 22 may be operated to activate coil 17 for either manually energizing or de-energizing the warning system.

The switch 23, attached to and operated by the speedometer of a vehicle, is connected between the battery 15 and coil 17 by means of contact 21 and lead 29. When switch 23 is closed it will energize the coil 17 only when the warning system is energized, i.e., when the switch arms 19, 19' are in abutment with contacts 21, 21'. The speedometer switch 23, similar to that utilized in present-day automobiles to indicate excessive speed, is automatically closed when a pre-selected speed has been regained by the vehicle and is thus automatically opened when the movement of the vehicle falls below the pre-selected speed. The switch may be adjusted so that various speeds may be selected to compensate for both city and country driving. It thus can be seen that the speedometer switch will automatically de-energize the warning system when a certain pre-selected speed is obtained; however, since contact 21 is normally open when the warning system is unenergized, the speedometer switch cannot energize the warning system.

The flasher or delay relay 24 is connected to the relay 16 by lead 30. Although an electron tube delay relay is shown, such as a 6F90 flasher tube produced by the Amperite Company, other forms of delay relays may be utilized, such as the known magnetic, thermal, or resistive types. A lead 31 connects a plurality of indicating lights 26 with the flasher unit 24. The indicating lights may be the rear brake lights or rear direction blinker lights of a vehicle, or they may be specially positioned spot tail lights which quickly draw the attention of following motorists. Since the flasher unit or delay relay interrupts the circuit to the indicating lights, once the system is energized, the lights will continually flash "on" and "off," until the warning system is de-energized, thereby more effectively directing a following motorist's attention to the fact that the vehicle in front of him is either decelerating rapidly or is stopping.

An audio and/or visual dashboard indicator 25 may be connected to lead 31. The indicator 25 is utilized to inform the motorist when his automatic warning system is energized, and as a check to see whether or not the system is functioning correctly. Further, the indicator may be used to apprise the motorist when it is desirable to manually energize or de-energize the system.

In operation, the arm 11 upon which the mercury switch 10 is mounted is pivotally adjusted so that the switch will be activated upon a desired deceleration of the vehicle. By changing the angle of inclination of the mercury switch with respect to the horizontal, the amount of deceleration necessary in order to force the mercury forwardly and upwardly into contact with the electrodes may accordingly be varied. As the mercury switch is pivoted toward the horizontal, it becomes more sensitive, so that the switch may close with a very small rate of deceleration, whereas when the switch is pivoted away from the horizontal, it becomes less sensitive and requires a larger rate of deceleration in order to force the mercury forwardly into closing contact with the electrodes.

When the warning system is in a de-energized state, it will be seen that switch arm 19 is closed on contact 20 and switch arm 19' is closed on dummy contact or stop 20'. Since contact 21 is then in an open position, speedometer switch 23 cannot energize the coil 17, even though the pre-selected speed at which speedometer switch 23 closes is reached. Also, since contact 21' is also open, the flasher 24, the dashboard indicator 25, and the rearward indicating lights 26 are all in an unenergized condition.

When the vehicle is decelerated above the pre-selected rate, the mercury within the mercury switch 10 will continue forward, due to its inertia, and momentarily contact leads 28 and 29, thereby transmitting an impulse to energize coil 17. It should be noted that the system is thus energized without the use of mechanical linkage between the vehicle and the coil. As the coil 17 is energized, it activates a ratchet arm to rotate the cams 18, 18', thereby moving switch arms 19, 19' from contacts 20, 20', respectively, to contacts 21, 21', respectively. Accordingly, the flasher 24, the dashboard indicator 25, and the indicating lights 26 are energized, with the flasher or delay relay 24 causing the indicating light 26 to pulsate or flash. Once energized, the indicating lights 26 will continue to flash, even after the vehicle has come to a complete stop and the brake released, until the coil 17 receives another impulse and the warning system de-energized.

The warning system may be manually de-energized by closing the dashboard switch 22, or it may be automatically de-energized by the vehicle attaining a pre-determined speed, thereby closing the speedometer switch 23. When the speedometer switch 23 is closed, another impulse will energize coil 17 to again rotate the cams 18, 18' so that switch arms 19, 19' return to contacts 20, 20', thereby de-energizing the warning system. The mercury switch 10 cannot de-energize the system, because when the system is energized, contact 20, leading to the switch 10, is open.

From the foregoing it can be seen that the manually operated dashboard switch 22 is the only switch when can both energize and de-energize the warning system, since the mercury switch 10 can only energize the system and cannot de-energize it, and the speedometer switch 23 can only de-energize the system and cannot energize it. It is therefore possible for a motorist to manually energize the warning system, such as when he may have a breakdown and find himself in a precarious position along a highway. Also, when the motorist is coming to a complete stop and does not intend to regain the required speed necessary to close switch 23, he may be de-activate the system manually by means of switch 22.

It will thus be seen that control unit 16 has pairs of alternate switch contacts and in this connection, 20 and 20' are closed with 19 and 19' when the switch contacts are in one position and 21 and 21' are closed with 19 and 19' when the contacts are in a second position. Thus, the speedometer switch 23, when closed, can only be effective in connecting the actuating means or coil 17 to the source of current 15 when the contact 21 is closed or, in other words, when the switch contacts are in their second position. FIGURE 2 indicates that the second position of the switch contacts is the position at which the visual signal means is energized; such means includes the delay-relay flasher 24, the tail lights 26 and the audio means or buzzer 25. It will be apparent that the speedometer switch can only serve to disconnect or de-energize the visual system and not to energize it. By the same token, the mercury switch 10 is only effective to energize the visual system, since it can only connect the actuating means or coil 17 to the source of energy 15 when the switch contacts are in the one position, such that contacts 19 and 20 are closed. On the other hand, the manual switch 22 which is connected directly between the source of the electrical energy 15 and the actuating means or coil 17 will function to energize the means 17 to either move it from the first position to the second position or from the second position to the first position, and independently of the mercury switch 10 and the speedometer switch 23.

Although we have shown and described our now preferred embodiment of our automatic warning system, it will be apparent to those skilled in the art that various changes and modifications may be made hereto without departing from the spirit and scope of the invention as defined in the following claims.

What we claim is:

1. In an improved warning system for controlling a visual signal and for providing it automatically upon the deceleration of a vehicle which comprises, a source of electrical energy, a normally open mercury switch mounted in an inclined position on the vehicle, a control unit having pairs of alternate switch contacts and an electrically energized actuating means for moving said switch contacts from one position to a second position upon its initial energization and for moving said switch contacts from the second position back to the one position upon its second energization, a visual signal means connected to said source of energy through said switch contacts when they are in the second position for giving warning, said mercury switch being closed upon a deceleration of vehicular movement to connect said actuating means to said source of energy when said switch contacts are in the one position for initially energizing said actuating means to move said switch contacts to the second position to connect said visual signal means to said source of energy, a second switch connected between said source of energy and said actuating means independently of said mercury switch for again energizing said actuating means to move said switch contacts from the second position back to the one position to de-energize said visual signal means.

2. In an improved warning system as defined in claim 1 wherein said second switch means is directly connected to said source of energy for the second energization of said actuating means independently of the position of said switch contacts.

3. In an improved warning system as defined in claim 1 wherein, said second switch is connected to said source of energy only through said switch contacts when they are in the second position whereby said second switch is effective to only de-energize said visual signal means by a second energization of said actuating means to move said switch contacts from the second position to the one position, and a third switch is connected directly between said source of energy and said actuating means independently of said mercury switch and said second switch to, when closed, energize said actuating means to move said switch contacts from the second position to the one position and to, when again closed, energize said actuating means to move said switch contacts from the second position to the one position.

4. In a warning system as defined in claim 1 wherein said second switch is connected through said switch contacts when they are in the second position to, when closed, electrically energize said actuating means.

5. In an improved warning system as defined in claim 4 wherein said second switch is a speedometer switch that is automatically closed when the vehicle has attained a selected rate of movement.

6. An improved warning system for controlling a visual signal and for providing it automatically upon the deceleration of a vehicle which comprises, a source of electrical energy, a normally open mercury switch in an inclined position on the vehicle, means for gauging and adjusting the inclined setting of said mercury switch, a control unit having pairs of alternate switch contacts and an electrically energized ratchet and cam actuating coil for moving said switch contacts from one closed position to a second closed position upon its initial energization and for moving said switch contacts from the second closed position back to the one closed position upon a second energization, a flashing visual signal means connected to said source through said switch contacts when they are in the second closed position for giving visual warning, said mercury switch being connected to said coil and being closed upon a deceleration of vehicular movement and connected to said source of energy through said switch contacts when they are in the one closed position for energizing said coil to move said switch contacts from the one closed position to the second closed position and to disconnect said mercury switch from said of energy; a speedometer switch connected to said coil and through said switch contacts to said source of energy when said contacts are in the second position to, when closed, again energize said coil for moving said switch contacts from the second position to the one position for disconnecting said speedometer switch from said source of energy, and a manual switch connected directly between said coil and said source of energy for energizing said coil independently of said switch contacts to independently of said speedometer switch energize said coil for moving said switch contacts from the second closed position to the one closed position and to independently of said mercury switch energize said coil for moving said switch contacts from the one closed position to the second closed position.

7. In an improved warning system as defined in claim 6 wherein said flashing visual signal means comprises, a delay relay flasher, a pair of tail lights for the vehicle connected to said flasher for providing flashing light at the rear of the vehicle, and an electrically energized audio means for positioning on the dashboard of the vehicle and connected to said delay-relay flasher for providing an indicating sound within the vehicle.

References Cited in the file of this patent

UNITED STATES PATENTS

| | | |
|---|---|---|
| 2,751,575 | Jacobs | June 19, 1956 |
| 2,895,082 | Suyetani | July 14, 1959 |
| 2,971,067 | Ticknor | Feb. 7, 1961 |

UNITED STATES PATENT OFFICE
CERTIFICATE OF CORRECTION

Patent No. 3,089,129            May 7, 1963

Euripides R. Nassikas et al.

It is hereby certified that error appears in the above numbered patent requiring correction and that the said Letters Patent should read as corrected below.

Column 2, line 30, for "appar-" read -- apparent --; column 6, line 29, after "said", second occurrence, insert -- source --.

Signed and sealed this 19th day of November 1963.

(SEAL)
Attest:
ERNEST W. SWIDER

EDWIN L. REYNOLDS

Attesting Officer

Acting Commissioner of Patents